United States Patent [19]

Cooley

[11] 4,372,762
[45] Feb. 8, 1983

[54] DUST COLLECTOR AND FILTER UNIT

[76] Inventor: Claude S. Cooley, 103 Inverness, Roanoke, Tex. 76262

[21] Appl. No.: 232,855

[22] Filed: Feb. 9, 1981

[51] Int. Cl.³ ............................................. B01D 50/00
[52] U.S. Cl. ...................................... 55/273; 55/302; 55/319; 55/337
[58] Field of Search .................. 55/302, 319, 337, 96, 55/348, 273

[56] References Cited

U.S. PATENT DOCUMENTS

| | | |
|---|---|---|
| 940,076 | 11/1909 | Seaver . |
| 2,250,226 | 7/1941 | Juelson . |
| 2,394,923 | 2/1946 | Little . |
| 2,790,509 | 4/1957 | Share ..................................... 55/324 |
| 2,983,384 | 5/1961 | Winslow . |
| 3,077,716 | 2/1963 | Wilson . |
| 3,234,716 | 2/1966 | Sevin et al. . |
| 3,508,383 | 4/1970 | Humbert, Jr. et al. ................ 55/337 |
| 3,541,631 | 11/1970 | Kluse et al. ............................. 55/342 |
| 3,541,764 | 11/1970 | Astrom .................................. 55/337 |
| 3,568,414 | 3/1971 | Spriggs et al. ......................... 55/294 |
| 3,651,621 | 3/1972 | Davis ..................................... 55/319 |
| 3,816,982 | 6/1974 | Regnault . |
| 3,853,518 | 12/1974 | Tu et al. . |
| 3,909,222 | 9/1975 | Caughlin et al. . |
| 4,062,664 | 12/1977 | Dupre et al. . |
| 4,077,781 | 3/1978 | Sundstrom ............................. 55/302 |
| 4,099,937 | 7/1978 | Ufken et al. . |
| 4,174,204 | 11/1979 | Chase .................................... 55/302 |
| 4,209,310 | 6/1980 | Berkhoel .............................. 55/498 |
| 4,280,826 | 7/1981 | Johnson ................................ 55/302 |

FOREIGN PATENT DOCUMENTS

| | | |
|---|---|---|
| 2550352 | 5/1976 | Fed. Rep. of Germany ........ 55/337 |
| 2027611 | 2/1980 | United Kingdom .................. 55/337 |

Primary Examiner—Bernard Nozick
Attorney, Agent, or Firm—Hubbard, Thurman, Turner & Tucker

[57] ABSTRACT

A modular dust collection and filtration apparatus including a housing forming a primary inertial and gravitational separation chamber and including first and second dust collection hoppers. A vertically extending duct is disposed in the housing and extends through a partition separating one of the hoppers from the primary separation chamber. A porous media filter element is disposed in the duct at the upper end thereof. A removable tower section of the housing is disposed around the duct to form flow passages leading to swirl vanes which introduce the flow stream into the duct. A reverse jet cleaning system includes repeat cycle timer controls for periodic reverse jet cleaning of the filter elements at different times to reduce impedance to air flow through the apparatus.

13 Claims, 5 Drawing Figures

DUST COLLECTOR AND FILTER UNIT

BACKGROUND OF THE INVENTION

1. Field of the Invention

This invention pertains to a collection and filter unit for separating particulate matter from an air flow stream utilizing inertial separation and an impingement type filter mounted within a structure which reduces the dust loadings imposed on the impingement or porous media filter element.

2. Background Art

In the art of separation of particulate matter from flow streams of air and other gases a number of different apparatus have been developed utilizing inertial separation techniques as well as employing impingement or porous media type filter elements for separating relatively fine particles which remain airborne even after several stages of inertial or gravitational separation. For example, in air filter apparatus for various types of machinery such as compressors and engines the filter unit is normally relatively compact and mechanically simple with reliance being placed on porous media or impingement type filter elements for performing substantially all of the separation or filtering action. Accordingly, these elements are constructed as economically as possible so that they may be thrown away and replaced with new elements as needed.

However, in industrial applications where substantially continuous and sometimes heavy loadings of airborne particulate matter must be dealt with it is important to provide for collection and filtration apparatus which is capable of reducing the loadings on the porous media type filter elements as well as, in many applications, reclaiming the separated particulate matter. The continued emphasis on reducing air pollution from industrial activity of one type or another has made it highly desirable to develop dust collection and filtration apparatus which is suitable for substantially continuous operation in industrial environments without the necessity of frequent replacement of porous media filter elements or the like.

It is also desirable that collection and filtration apparatus for airborne particulate matter be provided which will reduce the loadings on the porous media filter elements and also is adapted to reclaim the airborne particles which, in some instances, have commercial value. The present invention represents an improvement in this general category of collection and filtration equipment for airborne dust or particulate matter and comprises an apparatus which is mechanically uncomplicated, effective in operation and adapted to be of modular construction to suit various applications where removal of particulate matter or dust from the environment is required.

SUMMARY OF THE INVENTION

The present invention provides an improved collection and filtration apparatus for airborne particulate matter which is adapted to provide for staged separation of material from a moving air stream in such a way that the loading of a final stage impingement or porous media type filter element is substantially reduced as compared with prior art apparatus. In accordance with the present invention there is provided apparatus of improved construction which includes a housing defining an enlarged chamber for receiving an air flow stream laden with entrained particulate matter or dust wherein the velocity of the flow stream is reduced to allow inertial and gravitational separation of relatively coarse particles and wherein the flow stream is then conducted to a second chamber containing a porous media filter element for intermediate and final separation of relatively fine particles.

In accordance with one aspect of the present invention there is provided a collection and filtration apparatus for airborne particulate matter including a housing defining a primary separation chamber of relatively large volume and further defining a hopper for collecting coarse particles entrained in a flow stream entering the chamber and wherein the flow stream then proceeds to an enclosure including a vertically extending tubular duct containing an impingement or porous media type filter element. The interior of the duct, which encloses the porous media filter element and also comprises a secondary inertial separation chamber, is disposed within but is effectively isolated from the primary separation chamber to prevent air in the primary chamber from flowing directly to the impingement filter element before undergoing an intermediate stage of inertial separation. In accordance with another aspect of the present invention a unique and compact arrangement of a dust collection and filtration apparatus is provided which includes a primary separation chamber, centrifugal or swirl inducing vanes, a secondary separation chamber and a final porous media filter element.

In accordance with yet another aspect of the present invention there is provided a dust collection and filtration apparatus of improved construction whereby one or two sections of the apparatus each containing an impingement type filter element, may be mounted on a main housing structure to provide a substantially modular type of unit.

Still further in accordance with the present invention there is provided a collection and filtration apparatus for separating particulate matter from an air flow stream which is relatively uncomplicated mechanically but yet provides for a highly efficient separation and filtering process. By providing an uncomplicated housing defining a primary inertial separation chamber and a compact arrangement of a removable tower portion of the housing containing a porous media filter element, which is not directly exposed to the air flow stream entering the primary chamber, a more efficient and reliable unit is possible than has been realized with prior art apparatus.

It is an object of the present invention to provide an improved collection and filtration apparatus for airborne particulate matter wherein the relatively coarse particles are first removed from the air flow stream by inertial and gravitational forces and relatively fine particles remaining entrained in the flow stream are then removed by further inertial or centrifugal action and finally by a porous media type filter element arranged to be exposed to minimal loadings or material to air flow ratios.

It is one object of the present invention to provide a collection and filtration apparatus for cleaning air laden with entrained particulate matter generated by industrial processes of various types, which apparatus may be operated continuously and has an improved reverse air jet cleaning system, for the porous media filter element.

It is another object of the present invention to provide a collection and filtration apparatus for removing particulate matter from an air flow stream or the like which is mechanically uncomplicated, is relatively compact and yet provides for effective and efficient operation. The apparatus of the present invention may be manufactured, sold and operated at relatively low cost.

With the foregoing features and objects in view it will, however, be understood that the invention is not limited to the specific details of construction and arrangement shown in the accompanying drawings and described hereinbelow but may embody various changes and modifications within the scope of the inventive concept.

DESCRIPTION OF THE PREFERRED EMBODIMENTS

Figure 1:
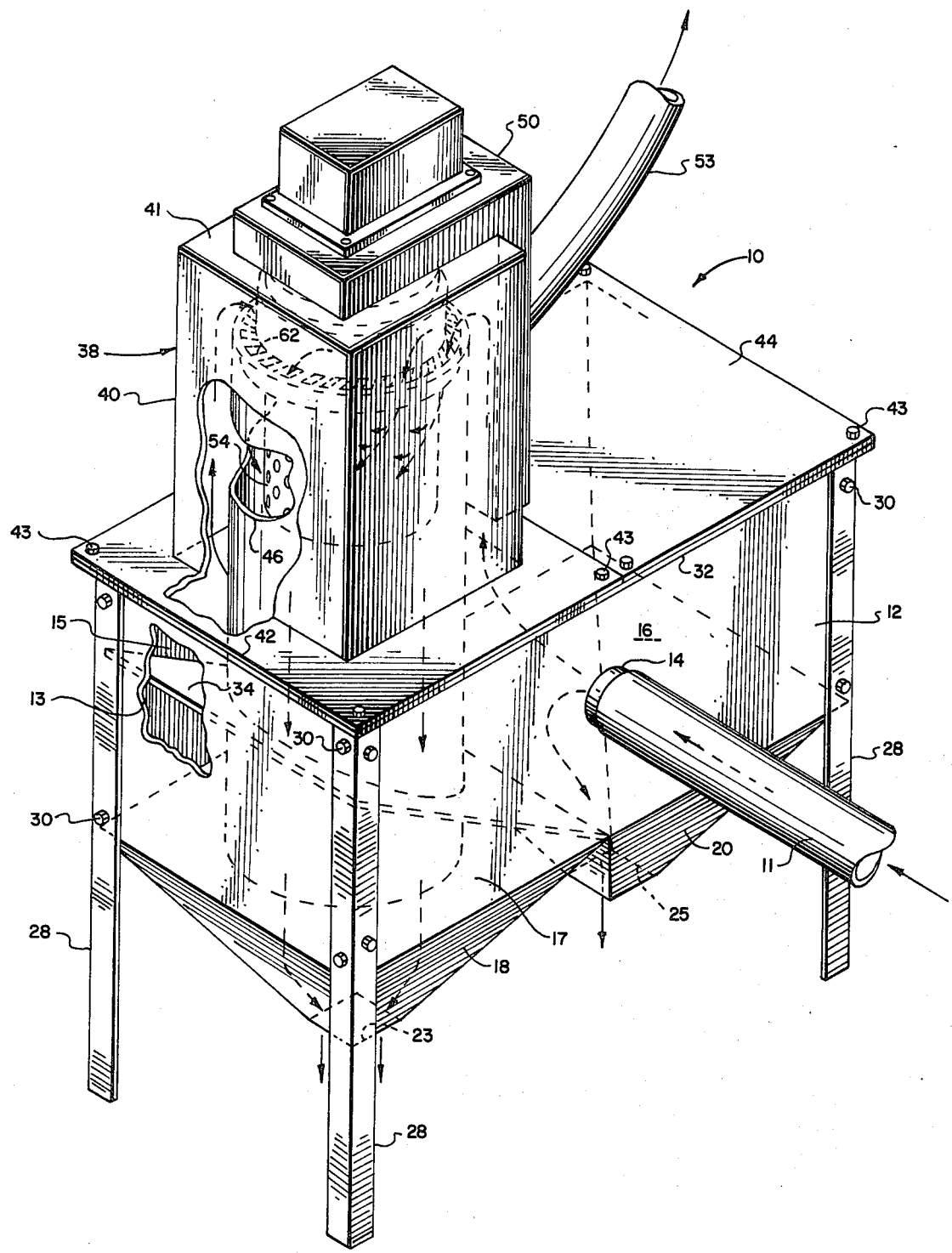
FIG. 1 is a perspective view partially broken away and illustrating and dust collection and filtration unit of the present invention.
Figure 2:
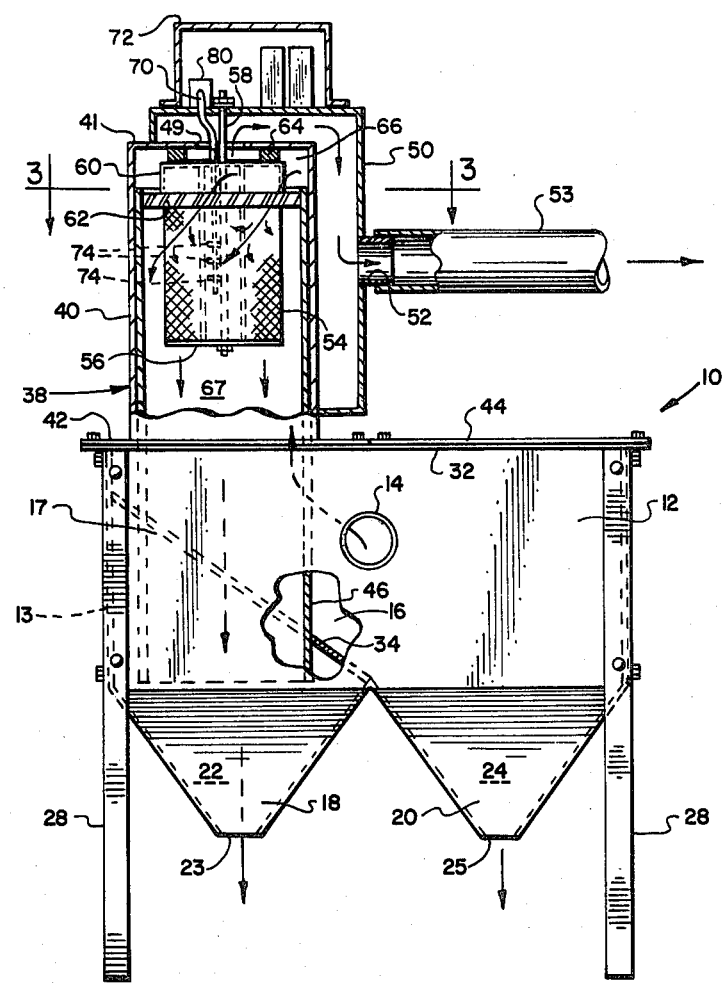
FIG. 2 is a vertical elevation showing a portion of the unit including the impingement type filter element in section.

Referring to FIGS. 1 and 2 of the drawings there is illustrated a dust collection and filtration unit in accordance with the present invention and generally designated by the numeral 10. The collection and filtration unit 10 comprises apparatus characterized by a generally rectangular housing 12 having an inlet conduit 14 in one vertical side wall which communicates with an interior chamber 16 formed by the housing. The bottom part of the housing 12 includes two spaced apart truncated pyramidal portions 18 and 20 forming, respectively, hoppers 22 and 24 for receiving particulate matter separated by the unit 10. The housing 12 is adapted to be supported on four spaced apart vertical legs 28 which may be formed from conventional steel or aluminum angle sections and which are removably fastened to the housing by suitable fasteners 30. The housing 12 is also characterized by a peripheral integral flange portion 32 disposed around the upper edge of the vertical side walls of the housing. The housing 12 is characterized as a generally tublike member having an open top delimited by vertical side and end walls and may be suitably formed in one piece of, for example, molded fiberglass or the like. The housing 12 may also be suitably fabricated of sheet metal, if desired. The apexes of the pyramidal shaped bottom parts 18 and 20 include respective openings 23 and 25 for discharging particulate matter from the respective hoppers 22 and 24. The discharge openings from the bottom parts 18 and 20 may be suitably connected to further material collection means for receiving material from the hoppers 22 and 24. Such collection means could comprise a conveyor mechanism or the like, or any substantially sealed enclosure, such as a pair of enclosed drums, not shown, for receiving the material from the hoppers. It is important that material not be allowed to collect in the hopper 22 sufficiently deep as to interfere with the flow of air within the duct 46. The openings in the bottom parts 18 and 20 may also be fitted with suitable doors, not shown, which may be periodically opened to discharge material collected within the hoppers 22 and 24, respectively.

As shown in FIG. 1, also, the hopper 22 is separated from the chamber 16 and the hopper 24 by a sloping partition 34 which is contiguous with the end wall 13, the opposite side walls 15 and 17 and extends down to and is contiguous with the intersection of adjacent sides of the truncated pyramidal bottom parts 18 and 20, as shown. Accordingly, dust laden air flowing into the chamber 16 through the opening 14 will normally undergo a decrease in velocity due to the enlarged volumetric capacity of the chamber 16 as compared with the conduit conducting the air stream to the filter unit 10. This action will result in inertial and gravitational forces acting on the relatively coarse particles entrained in the air stream, which particles will fall onto the partition 34 as well as directly into the hopper 24. The material which falls onto the partition 34 will normally slide downwardly into the hopper 24 as will be appreciated by those skilled in the art.

The collection and filtration unit 10 further includes a housing member, generally designated by the numeral 38, comprising a hollow box-like tower portion 40 integrally formed with a generally rectangular peripheral flange 42 adapted to be in sealing engagement with a portion of the flange 32 as illustrated in FIG. 1. In the embodiment of the present invention illustrated in FIG. 1, the remaining portion of the top of the housing 12 is covered by a cover plate 44 having the same peripheral dimensions as the flange 42. The flange 42 and cover plate 44 are secured to the flange 32 by suitable threaded fasteners 43.

Figure 3:
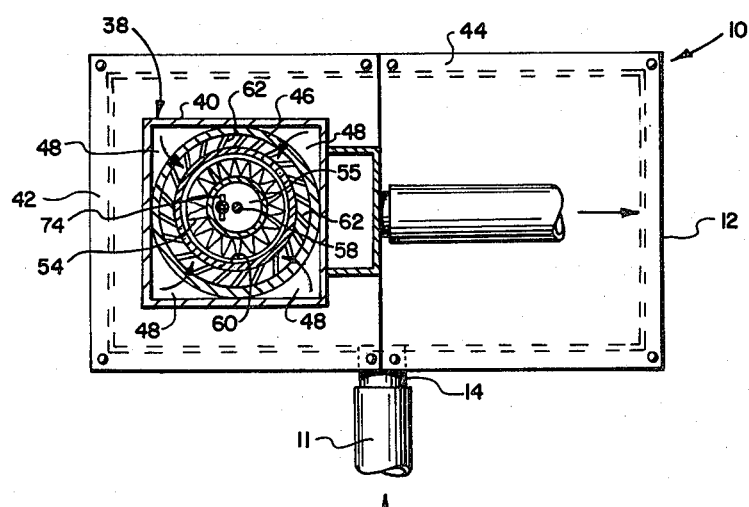
FIG. 3 is a section view taken substantially along the line 3—3 of FIG. 2.

Referring also to FIGS. 2 and 3, the housing member 38 is adapted to be disposed over a vertically extending cylindrical tubular duct 46 which extends from the hopper 22 upwardly through the partition 34 and into the interior of the tower portion 40 as shown. As shown in FIG. 3, the duct 46 has a peripheral dimension which permits it to fit snugly within the interior of the tower portion 40 to provide for somewhat triangular shaped flow channels or passages 48 which are in communication with the chamber 16. Alternatively, the duct 46 could be smaller than the interior chamber defined by the side walls of the tower portion 40 which would provide a continuous circumferential flow passage instead of the individual channels 48. Moreover, those skilled in the art will appreciate that the tower portion 40 could be cylindrical in cross sectional shape, rather than square as illustrated, and spaced from the duct 46 to provide an annular flow passage in place of the four separate flow passages 48.

The tower portion 40 includes a horizontal top wall 41 having a central opening 49 therein in communication with a clean air outlet duct 50 which is suitably fastened to the housing 38 and includes an outlet opening 52 for discharging dust free air from the collection and filtration unit 10. The opening 52 may, of course, be in communication with further duct means 53, for example, for conducting clean air to a final discharge point as desired.

As further shown in FIGS. 1, 2 and 3 of the drawings the filtration unit 10 includes a porous media or impingement type filter element, generally designated by the numeral 54, disposed within the interior of the housing portion 40 as well as substantially within the interior of the tubular duct 46. The filter element 54 may be of the pleated paper type similar to that, for example, disclosed in U.S. Pat. No. 4,209,310. The filter element 54 includes a bottom support member 56 having a suitable central opening for receiving an elongated bolt 58 extending from the outer top side of the duct 50 down through the center of the filter element and fitted with a nut to retain the filter element fixed within the tower portion 40, as shown.

The filter element 54 is fitted with a cylindrical cap member 60 which is removably disposed over the top of the element and includes around its lower edge a cylindrical flange including a plurality of radially extending stationary swirl vanes 62 which are pitched with respect to the longitudinal central axis of the filter element to induce a helical flow pattern to air flowing in the axial direction downwardly through the vanes into the interior of the duct 46. The peripheral edges of the vanes 62 are closely fitted within the interior of the duct 46 adjacent to the top edge thereof to provide for directing substantially all of the air flowing into the duct to pass through the passageways between adjacent vanes and be induced to flow in a generally helical or swirling flow path around the periphery of the filter element 54. The cap 60 is removably fitted over the filter element 54 and is held in assembly therewith within the housing 38. The cap 60 is sealingly engaged with a gasket 64 disposed between the cap and the wall 41 to prevent dust laden air from escaping directly from a chamber 66 to the outlet duct 50. As will be appreciated from the foregoing description the chamber 66 is in communication with the passages 48 for receiving the air flow stream with particles entrained therein which have not been separated in the chamber 16.

Referring further to FIG. 2 the collection and filtration unit 10 also includes means for cleaning the filter element 54 by providing a plurality of air jets directed generally in the reverse or opposite direction to the flow of air through the filter element for periodically blasting dust collected on the filter element itself off of the element whereby such collected dust will fall down through the tubular duct 46 into the hopper 22 and into the final discharge means, not shown. The reverse air jet cleaning means comprises a vertically depending tube 70 extending from an enclosure 72 mounted on top of the duct 50 downwardly in the interior of the filter element 54 and connected to a plurality of spaced apart tube fittings 74, see FIG. 4, providing oppositely directed outlet nozzles 76 which may be formed in a radially projecting pattern as desired. The tube 70 is connected to a normally closed solenoid operated valve disposed within the enclosure 72 and generally designated by the numeral 80. The valve 80 is adapted to be in flow receiving communication with a source of pressure air by way of a conduit 82, FIG. 4, which may include a pressure regulator 83 depending on the supply pressure of the source of pressure air, not shown.

Figure 4:
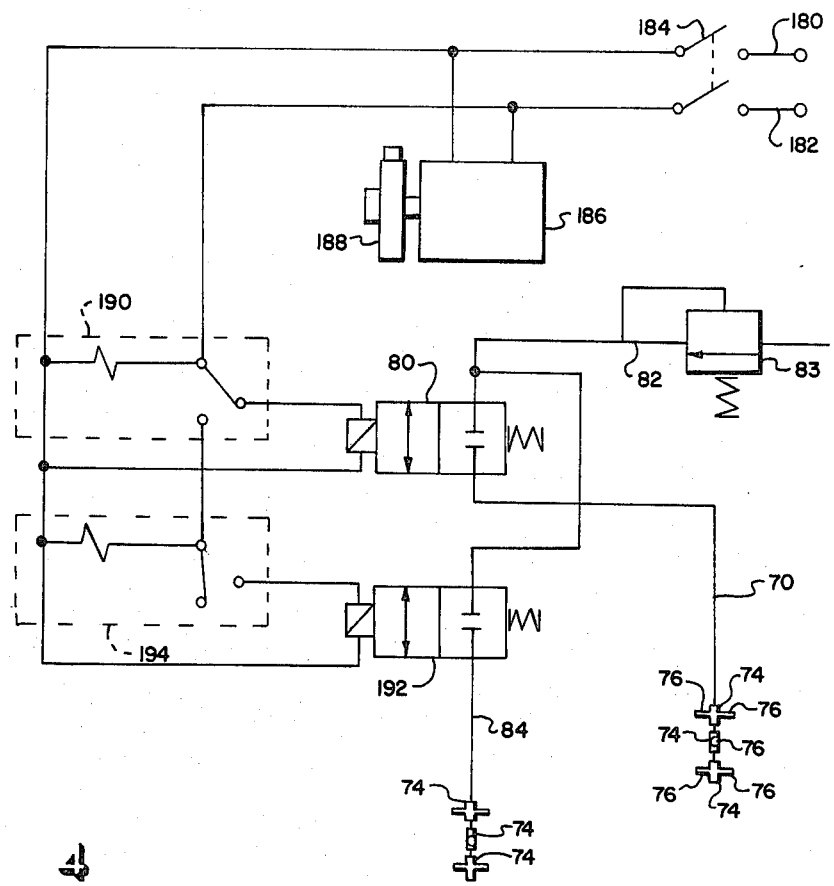
FIG. 4 is a schematic diagram of the reverse jet cleaning control circuit used in conjunction with the apparatus of the present invention.

The valve 80 is adapted to be connected to a source of electrical energy by way of a timing control circuit to be described further herein to provide for energizing the valve periodically to deliver short bursts or pulses of pressure air through the nozzles 76 to blow dust off of the porous medial filter element 54. The arrangement according to the present invention and illustrated in FIGS. 2 and 4 is believed to provide a simple and yet unique and effective means for keeping the filter element relatively clean and to prevent excessive loading and clogging of the element itself. Those skilled in the art will appreciate that additional fittings 74 may be provided spaced apart as shown depending on the length of the filter element and the greatest concentration of dust laden air flow through the element.

Referring to FIG. 4 of the drawings, the control circuit for the filtration unit 10 preferably includes a source of electrical power, not shown, to which the lines 180 and 182 may be connected and have interposed therein a main switch 184. A suitable electric motor 186 is also in circuit with the control system and is operably connected to a suction blower or pump 188 which would be adapted to be in communication with the outlet conduit 52. The control circuit illustrated in FIG. 4 also includes a repeat cycle timer type relay generally designated by the numeral 190 which may, for example, be of a type manufactured by the Amerace Company, Union, New Jersey, under the trademark AGASTAT and specifically may be a model number SRC72ADGA. The timer 190 is adapted to control the valve 80 for providing timed pulses of reverse jet cleaning air to the tube 70, for example. The timer 190 is of a type which may be selectively controlled to automatically open the valve 80 for a predetermined duration of time at predetermined intervals, depending on the application of the filtration unit 10 and the dust loadings incurred by the filter element 54.

As shown in FIG. 4, the control circuit 84 may also include a second control valve 192 adapted to be in communication with the supply line 82 and also adapted to be controlled by a timing relay, generally designated by the numeral 194. The timing relay 194 may also be of the type manufactured by the abovementioned company under the trademark AGASTAT and may be a model of the SCA series which is provided with an adjustable time delay relay for supplying a signal to energize the valve 192. In accordance with the circuit diagram of FIG. 4 when the repeat cycle timer 190 is in the "off" position, with respect to supplying a signal to the valve 80, the timing relay 194 has operating voltage applied thereto and, after a suitable time delay, is operable to open the valve 192 to provide reverse jet cleaning air to a tube 84 similar to the tube 70 for cleaning the filter element of a second filtration unit. When the timer 190 resumes the "on" position to energize the solenoid of valve 80 valve 192 is closed and the timing relay 194 is reset for another cycle. The complete circuit illustrated in FIG. 4 may be adapted to operate with an embodiment of the present invention illustrated in FIG. 5, for example. In accordance with the complete control circuit illustrated in FIG. 4 reverse jet cleaning air would be provided to only one impingement filter element at a time whereby air flow through a filtration system having two filter elements would not be substantially impeded during the reverse jet cleaning of one or the other of two elements.

In operation, the collection and filtration apparatus 10 would be connected to a source of dust laden air by way of, for example, a conduit 11 connected to the inlet opening 14 to the housing 12. Air flow through the unit 10 may be induced by either a positive pressure from a blower or pump, not shown, disposed upstream of the filtration unit or by a suction blower or pump, such as the pump 188, disposed downstream of the opening 52 in the clean air outlet duct. Regardless of whether or not a positive or negative pressure condition exists within the filtration unit 10, relative to ambient atmosphere, the overall operation of the unit is unaffected. Under either operating condition as air laden with particulate matter enters the chamber 16 through the duct 11 the velocity of the flow stream is normally substantially reduced because of the enlarged flow area of the chamber as compared to the inlet duct. Some of the heavier particles entrained in the flow stream may impinge the side wall of the housing 12 opposite that in which the opening 14 is disposed whereupon the material will normally separate out of the air flow stream and fall into the hopper 24. Moreover, the reduced flow velocity of the air entering the chamber 16 will also, due to gravitational forces, permit separation of some of the heavier particles entrained in the flow stream.

The flow entering the chamber 16 is directed around the exterior of the tubular duct 46 and upwardly through the generally triangular shaped passages 48 formed in the tower portion 40 as described hereinabove. The relatively fine particles remaining in the air flow stream as it courses upward through the passages 48 into the chamber 66 will remain entrained in the flow as it reverses direction and passes through the swirl vanes 62. As the flow passes through the swirl vanes 62 into chamber 67 its direction is altered and caused to follow a generally helical as well as vortical flow path due to the tendency for the flow to pass through the filter element 54 into the interior passage 55, FIG. 3. This swirling vortical flow will result in further inertial separation of entrained particles in the air flow stream, which particules will then fall vertically downwardly into the hopper 22. The remaining relatively fine particles entrained in the ar as it flows through the filter element 54 will be separated by impingement against the porous media of the filter which may be, for example, pleated paper. Substantially dust free air passing into the passageway 55 is then conducted through the outlet duct 50. During reverse jet cleaning of the filter element 54 the dust blown off of the filter element will also fall downwardly within the interior of the duct 46 into the hopper 22.

Those skilled in the art will appreciate from the foregoing description that the arrangement of the collection and filtration apparatus 10 is particularly advantageous in the art of collection and filtration equipment. By providing for the filter element 54 to be disposed within the tubular duct 46 relatively coarse particles are separated from the flow stream before it reaches the filter element and, in fact, no short circuiting of the flow path of the dust laden air directly to the filter element is possible as is the case with prior art dust collection and filtration equipment. Furthermore, the arrangement of the filter element 54 within the vertical tower-like housing member 38 together with the arrangement of the swirl vanes 62 provides for a vertically downward vortical flow of the dust laden air whereby a combination of inertial and gravitational action on the entrained particles separates a substantial portion of the particulate matter remaining entrained in the flow stream after it passes out of the chamber 16 and into the chamber 67 formed by the interior of the tubular duct 46.

As previously mentioned the housing 12 may be advantageously formed of one piece construction as a molded fiberglass member or another suitable molded plastic. In like manner, the housing member 38 may be formed as a one piece member including the flange 42 also of a suitable plastic or fiberglass construction. Since the unit 10 is normally subjected to relatively low pressures in either a positive or negative sense with respect to atmospheric pressure the construction of the unit may be relatively lightweight. For applications where particularly abrasive material is to be separated from the flow stream it may also be advantageous to provide for the tubular duct 46 to be formed of an abrasion resistant plastic material or, if formed of metal, to be coated on the interior wall with a rubber or plastic coating to also resist abrasion.

The collection and filtration unit 10 is easily serviced, as needed, by moving the fasteners 43 which secure the flange 42 to the flange 32 and removing the housing member 38 from the housing 10. The duct 46 is preferably secured to the sloping partition 34 so that when the housing 38 is removed relatively easy access may be gained to the filter element 54 for removal thereof by, for example, removing the bolt securing the filter element within the housing member.

Figure 5:
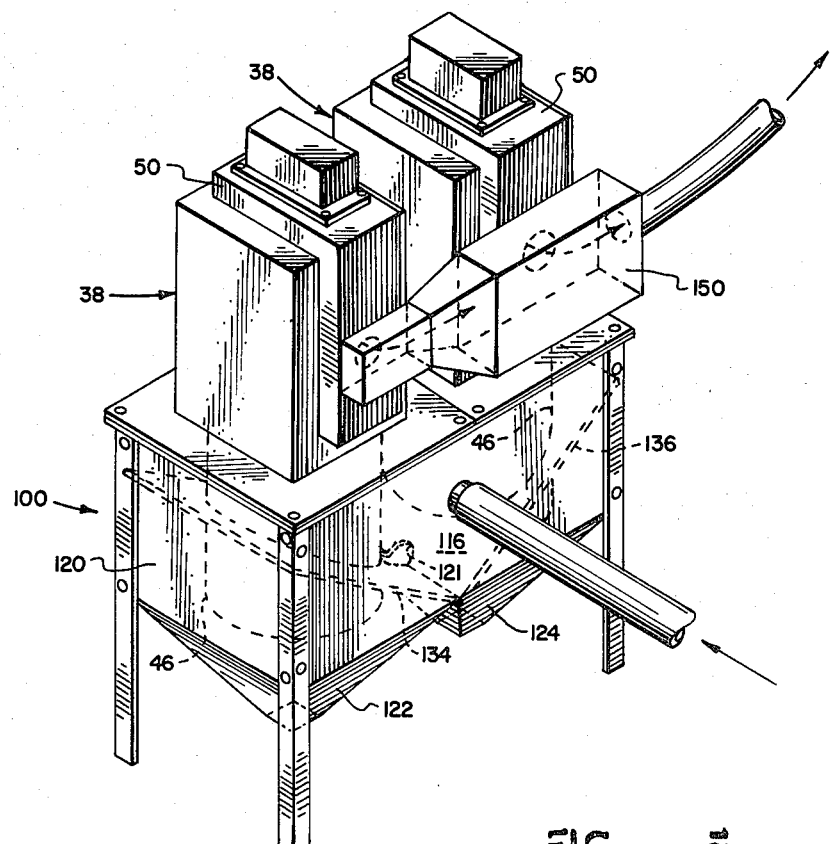
FIG. 5 is a perspective view of an alternate embodiment of the present invention.

Referring to FIG. 5, an alternate embodiment of the present invention is illustrated and generally designated by the numeral 100. The collection and filtration unit 100 includes a housing 120 similar to the housing 12 and separate housing members 38 mounted on the top flange of the housing 120 and including, respectively, output ducts 50 connected to a common final output duct 150. Accordingly, the collection and filtration unit 100 includes two final impingement type filter elements 54 disposed within the respective housings 38 and whereby the capacity of the unit 100 is substantially greater than the unit 10. The housing 120 is similar to the housing 12 but is modified to provide for opposed sloping partitions 134 and 136 similar to the partition 34 and sloping from opposite end walls of the housing 120 toward each other to separate respective material discharge hoppers 122 and 124 from each other and from the inlet chamber 116.

As shown in FIG. 5, separate tubular duct members 46 project through the partitions 134 and 136 into the hoppers 122 and 124, respectively. The housing 120 is also provided with a centrally disposed outlet 121 from the chamber 116 whereby material separated from the flow stream within the chamber 116 may be discharged from the housing 120 by suitable means, not shown. Accordingly, the collection and filtration apparatus 100 is adpated to utilize a substantial number of components as used in the filtration apparatus 10 and, in fact, the only major difference between the two units is the modification of the main housing to provide for the partition 136 and the central material discharge outlet 121 at the base of the hopper portion formed by the sloping partitions 134 and 136.

Those skilled in the art will recognize that further modularization of the collection and filtration unit of the present invention may be provided by adding housing members 38 to further modified forms of the main housing 12 in, for example, a quad configuration. Moreover, it will further be recognized by those skilled in the art that by providing the filter elements 54 within separate tubular duct members 46 and isolated from the primary separation chamber as well as from each other that, during the reverse jet cleaning of the filter elements, the dust removed from one filter element cannot cross over and be entrained in the air flow proceeding to the other element.

Although two embodiments of the present invention are disclosed those skilled in the art will appreciate that further modifications and substitutions may be made without departing from the scope or spirit of the present invention as recited in the appended claims.

What I claim is:

1. Apparatus for separating particulate material from an air flow stream or the like comprising:

a housing including a first member defining a first chamber in flow receiving communication with an air flow stream laden with entrained particulate material, said first chamber defining means for separating relatively coarse particles by inertial and gravitational forces acting thereon;

a first hopper in said housing in communication with said first chamber for receiving material separated from said ar flow stream;

a second chamber in said housing defined at least in part by means comprising an elongated duct disposed in said housing;

a partition disposed within said first member and forming a common wall separating said first chamber from said second chamber, said partition being disposed in surrounding relationship with respect to said duct;

a porous media filter element disposed in said part of said second chamber defined by said duct;

said housing including a second member comprising a vertically extending tower section, and said duct extends from said first member into said tower section and forms generally vertically extending passage means between said second member and said duct and interconnecting said first and second chambers for conducting said air flow stream generally upward toward second chamber from said first chamber, said passage means terminating at an inlet to said second chamber whereby said air flow stream flows generally downwardly upon entering said second chamber;

a second hopper in said housing in commmunication with said second chamber for receiving material separated from said air flow stream in said second chamber; and conduit means in communication with said filter element for conducting relatively clean air from said housing after said air has passed through said filter element.

2. Apparatus for separating particulate material from an air flow stream or the like comprising:

a housing including a first member defining a first chamber in flow receiving communication with an air flow stream laden with entrained particulate material, said first chamber defining means for separating relatively coarse particles by inertial and gravitational forces acting thereon;

a first hopper in said housing in communication with said first chamber for receiving material separated from said air flow stream;

a second chamber in said housing defined at least in part by means comprising an elongated duct disposed in said housing;

a partition disposed within said first member and forming a common wall separating said first chamber from said second chamber;

a porous media filter element disposed in said part of said second chamber defined by said duct;

said housing including a second member comprising a vertically extending tower section and said duct extends from said first member into said tower section and forms generally vertically extending passage means between said second member and said duct and interconnecting said first and second chambers for conducting said air flow stream generally upward toward said second chamber from said first chamber, said passage means terminating at an inlet to said second chamber whereby said air flow stream flows generally downwardly upon entering said second chamber;

a second hopper in said housing in communication with said second chamber for receiving material separated from said air flow stream in said second chamber, said duct extending vertically downward through said partition toward said second hopper; and conduit means in communication with said filter element for conducting relatively clean air from said housing after said air has passed through said filter element.

3. The apparatus set forth in claim 2 wherein:
said first and second hoppers are formed in said first member.

4. The apparatus set forth in claim 2 wherein:
said partition slopes vertically toward said first hopper in said housing.

5. The apparatus set forth in claim 2 wherein:
said filter element comprises a hollow cylindrical member mounted in said tower section and extending downwardly into said duct.

6. The apparatus set forth in claim 2 together with:
a third member comprising a second vertically extending tower section of said housing disposed adjacent to said first mentioned tower section, a second duct extending vertically from said first member into said second tower section a filter element disposed in said second duct, and a second partition disposed in said first member and forming a common wall between said first chamber and a third chamber in said housing.

7. The apparatus set forth in claim 6 together with:
reverse jet cleaning means for said filter elements including conduit means leading to each filter element, a solenoid operated valve interposed in each conduit means, and an electrical control circuit including a first repeat cycle timer for periodically opening and closing one of said valves, a timing relay in circuit with said timer for receiving a signal from said timer when said one valve is closed and for operating said other valve to open momentarily during a predetermined time period which commences with the closing of said one valve and ends with the opening of said one valve.

8. The apparatus set forth in claim 2 wherein:
said apparatus includes flow deflection means for inducing said air flow stream to undergo a swirling flow path in said second chamber for causing inertial separation of material from said air flow stream.

9. The apparatus set forth in claim 8 wherein:
said flow deflection means comprises a ring of radially projecting swirl vanes interposed in said passage means at the entrance into said second chamber.

10. Apparatus for separating particulate material from an air flow stream comprising:

a housing including a first member forming an enclosure defining a first chamber for receiving an air flow stream laden with particulate material, and first and second hopper portions for collecting material separated from said air flow stream;

a vertically extending hollow tower section of said housing;

an elongated duct extending vertically within said first member and said tower section and above said second hopper, said duct forming a second chamber for receiving said air flow stream, said duct and said tower section defining therebetween vertically extending passage means for conducting said air flow stream generally upward from said first chamber toward an inlet to said second chamber, said air flow stream upon passing through said inlet being directed generally downward into said second chamber;

an annular ring of flow deflecting vanes disposed in said tower section at said inlet to said second chamber from said passage means for inducing inertial separation of material from said air flow stream in said second chamber;

partition means in said first member forming a common wall between said first chamber and said second chamber and said second hopper;

a generally hollow cylindrical porous media filter element disposed in said second chamber and in flow communication with an outlet duct mounted on said tower section;

said apparatus being arranged to provide for said air flow stream to enter said first chamber whereby relatively coarse particles of material are separated from said air flow stream inertial and gravitational forces, said air flow stream being conducted through said passage means to said second chamber whereby further inertial and gravitational separation of material is induced followed by separation of material by said filter element as said flow stream passes through said filter element to said outlet duct.

11. The apparatus set forth in claim 10 wherein:
said vanes are formed on a cylindrical cap disposed over one end of said filter element and at the upper end of said duct.

12. The apparatus set forth in claim 10 wherein:
said first member comprises a one piece molded tub having an open top and a generally horizontally disposed peripheral flange, and said tower section comprises a housing part having a lower peripheral flange adapted to provide for mounting said tower section on top of said first member.

13. Apparatus for separating particulate material from an air flow stream comprising:
a housing including a first member forming an enclosure defining a first chamber for receiving an air flow stream laden with particulate material, and first and second hopper portions for collecting material separated from said flow stream;

a vertically extending hollow tower section of said housing removably mounted on said first member;

an elongated duct extending vertically within said first member and said tower section and forming a second chamber for receiving said air flow stream, said duct and said tower section defining therebetween passage means for conducting said air flow stream from said first chamber to said second chamber, said duct extending above said second hopper;

means for inducing inertial separation of material from said flow stream in said second chamber;

partition means in said first member forming a common wall between said first chamber and said second chamber and said second hopper;

a generally hollow cylindrical porous media filter element disposed in said second chamber and in flow communication with an outlet duct mounted on said tower section;

said apparatus being arranged to provide for said air flow stream to enter said first chamber whereby relatively coarse particles of material are separated from said air flow stream by inertial and gravitational forces, said air flow stream being conducted through said passage means to said second chamber whereby further inertial separation of material is induced followed by separation of material by said filter element as said air flow stream passes through said filter element to said outlet duct, and said apparatus includes:

reverse air jet cleaning means for said filter element comprising a conduit disposed within a central passage in said filter element for conducting pressure air from a source to spaced apart fittings connected to said conduit providing a plurality of radially directed reverse flow jets of air through said filter element to remove particulate material collected on said porous media, and solenoid operated valve means interposed in said conduit and operable when energized to provide for the flow of pressure air through said conduit.

* * * * *